(12) United States Patent
Kim et al.

(10) Patent No.: US 11,780,591 B2
(45) Date of Patent: Oct. 10, 2023

(54) ENVIRONMENTAL CONTROL SYSTEM PERFORMANCE MONITORING

(71) Applicant: Honeywell International Inc., Charlotte, NC (US)

(72) Inventors: Kyusung Kim, Plymouth, MN (US); Qingqiu Ginger Shao, Oro Valley, AZ (US); Roy Araki, Redondo Beach, CA (US); Bin Dong, Beijing (CN); Qi Li, Tianjin (CN); Gary Kumagai, Walnut, CA (US)

(73) Assignee: Honeywell International Inc., Charlotte, NC (US)

( * ) Notice: Subject to any disclaimer, the term of this patent is extended or adjusted under 35 U.S.C. 154(b) by 9 days.

(21) Appl. No.: 16/949,993

(22) Filed: Nov. 23, 2020

(65) Prior Publication Data
US 2022/0161931 A1    May 26, 2022

(51) Int. Cl.
*B64D 13/06*        (2006.01)

(52) U.S. Cl.
CPC ...... *B64D 13/06* (2013.01); *B64D 2013/0611* (2013.01)

(58) Field of Classification Search
CPC .................. B64D 13/06; B64D 2013/0611
See application file for complete search history.

(56) References Cited

U.S. PATENT DOCUMENTS

| | | | | |
|---|---|---|---|---|
| 4,924,401 | A | * | 5/1990 | Bice .................. G05D 1/0646 342/29 |
| 6,216,064 | B1 | * | 4/2001 | Johnson ............. G01S 19/39 701/4 |
| 6,239,745 | B1 | * | 5/2001 | Stratton ............ G01S 19/393 342/410 |

(Continued)

FOREIGN PATENT DOCUMENTS

| | | |
|---|---|---|
| CN | 107168205 A | 9/2017 |
| CN | 107807628 A | 3/2018 |

OTHER PUBLICATIONS

Jennions et al., "Simulation of an aircraft environmental control system," [abstract only], ScienceDirect, Applied Thermal Engineering, vol. 172, May 25, 2020, 3 pp.

(Continued)

*Primary Examiner* — Gordon A Jones
(74) *Attorney, Agent, or Firm* — Shumaker & Sieffert, P.A.

(57) ABSTRACT

An example system for determining a performance status of an environmental control system (ECS) in a vehicle includes memory and processing circuitry. The processing circuitry is configured to determine, based on one or more of the aircraft data, the weather data, or the trending data, an estimated compressor exit temperature. The processing circuitry is configured to determine a current residual compressor exit temperature based on the estimated compressor exit temperature and a current compressor exit temperature. The processing circuitry is configured to determine whether a (Continued)

residual condition is met based at least in part on the residual compressor exit temperature and whether a pack condition is met based at least in part on a pack temperature. The processing circuitry is configured to provide an indication of the performance status of the ECS based on at least one of the residual condition or the pack condition being met.

9 Claims, 5 Drawing Sheets

(56) References Cited

U.S. PATENT DOCUMENTS

| | | | | |
|---|---|---|---|---|
| 6,640,165 | B1* | 10/2003 | Hayward | G01C 5/005 |
| | | | | 701/4 |
| 8,121,817 | B2 | 2/2012 | Landells et al. | |
| 9,724,979 | B1 | 8/2017 | Thumati et al. | |
| 9,971,969 | B2 | 5/2018 | Horabin et al. | |
| 10,220,955 | B2* | 3/2019 | Gregory | G01K 7/16 |
| 10,242,508 | B2 | 3/2019 | Kim et al. | |
| 10,495,334 | B2 | 12/2019 | Perez | |
| 10,534,359 | B2* | 1/2020 | Dong | G05B 23/0283 |
| 2008/0005035 | A1* | 1/2008 | Schwartz | G06F 21/31 |
| | | | | 705/325 |
| 2018/0001242 | A1* | 1/2018 | Lynn | B01D 39/10 |
| 2018/0197350 | A1* | 7/2018 | Kim | G05B 23/0283 |
| 2018/0273211 | A1* | 9/2018 | Chang | H02J 7/007 |
| 2019/0391573 | A1 | 12/2019 | Wang | |
| 2020/0320803 | A1 | 10/2020 | Shao et al. | |

OTHER PUBLICATIONS

Extended Search Report from counterpart European Application No. 21208025.3, dated Apr. 29, 2022, 7 pp.

Response to Extended Search Report dated Apr. 29, 2022, from counterpart European Application No. 21208025.3, filed Jun. 14, 2022, 38 pp.

* cited by examiner

ENVIRONMENTAL CONTROL SYSTEM PERFORMANCE MONITORING

TECHNICAL FIELD

The present disclosure relates to systems and techniques for performance monitoring of a vehicle environmental control system.

BACKGROUND

Vehicles, such as aircraft, may include an environmental control system (ECS). An ECS may supply a vehicle with air and may provide climate control (e.g., temperature and pressure) within the cabin of the vehicle. Over time, an ECS may begin to fail due to, for example, environmental factors, such as polluted air. When an ECS of an aircraft fails or performs below expectations, the aircraft may have to be pulled out of service for maintenance due to safety concerns. Pulling an aircraft out of service may have financial implications for an airline and may be an inconvenience to the airline's passengers.

SUMMARY

In general, the disclosure is directed to a system and techniques for determining a performance status of an environmental control system (EC S) in a vehicle. In particular, the disclosure is directed to a system and techniques to predict when an ECS may be likely to fail.

In some examples, the disclosure describes a system including a memory, the memory being configured to store aircraft data, weather data, and trending data, the trending data comprising past compressor exit temperatures and past pack temperatures; and processing circuitry communicatively coupled to the memory, the processing circuitry being configured to: determine, based on one or more of the aircraft data, the weather data, or the trending data, an estimated compressor exit temperature; receive, from a first temperature sensor, a measure of a current compressor exit temperature; determine, based on the estimated compressor exit temperature and the current compressor exit temperature, a current residual compressor exit temperature; determine, based at least in part on the current residual compressor exit temperature, whether a first residual condition is met; determine, based on the determination of whether the first residual condition is met, a first performance status of the ECS; receive, from a second temperature sensor, a measure of a current pack temperature; determine, based at least in part on the current pack temperature, whether a first pack condition is met; determine, based on the determination of whether the first pack condition is met, a second performance status of the ECS; and provide, based on at least one of the first performance status or the second performance status, an indication of the performance status of the ECS.

In some examples, the disclosure describes a method including determining, by processing circuitry and based on one or more of aircraft data, weather data, or trending data, an estimated compressor exit temperature; receiving, by the processing circuitry from a first temperature sensor, a measure of a current compressor exit temperature; determining, by the processing circuitry, a current residual compressor exit temperature based on the estimated compressor exit temperature and the current compressor exit temperature; determining, by the processing circuitry and based at least in part on the current residual compressor exit temperature, whether a first residual condition is met; determining, by the processing circuitry and based on the determination of whether the first residual condition is met, a first performance status of an environmental control system (ECS); receive, by the processing circuitry from a second temperature sensor, a measure of a current pack temperature; determining, by the processing circuitry and based at least in part on the current pack temperature, whether a first pack condition is met; determining, by the processing circuitry and based on the determination of whether the first pack condition is met, a second performance status of the ECS; and providing, by the processing circuitry and based on at least one of the first performance status or the second performance status, an indication of a performance status of the ECS.

The details of one or more examples are set forth in the accompanying drawings and the description below. Other features, objects, and advantages will be apparent from the description and drawings, and from the claims.

DETAILED DESCRIPTION

Figure 1:
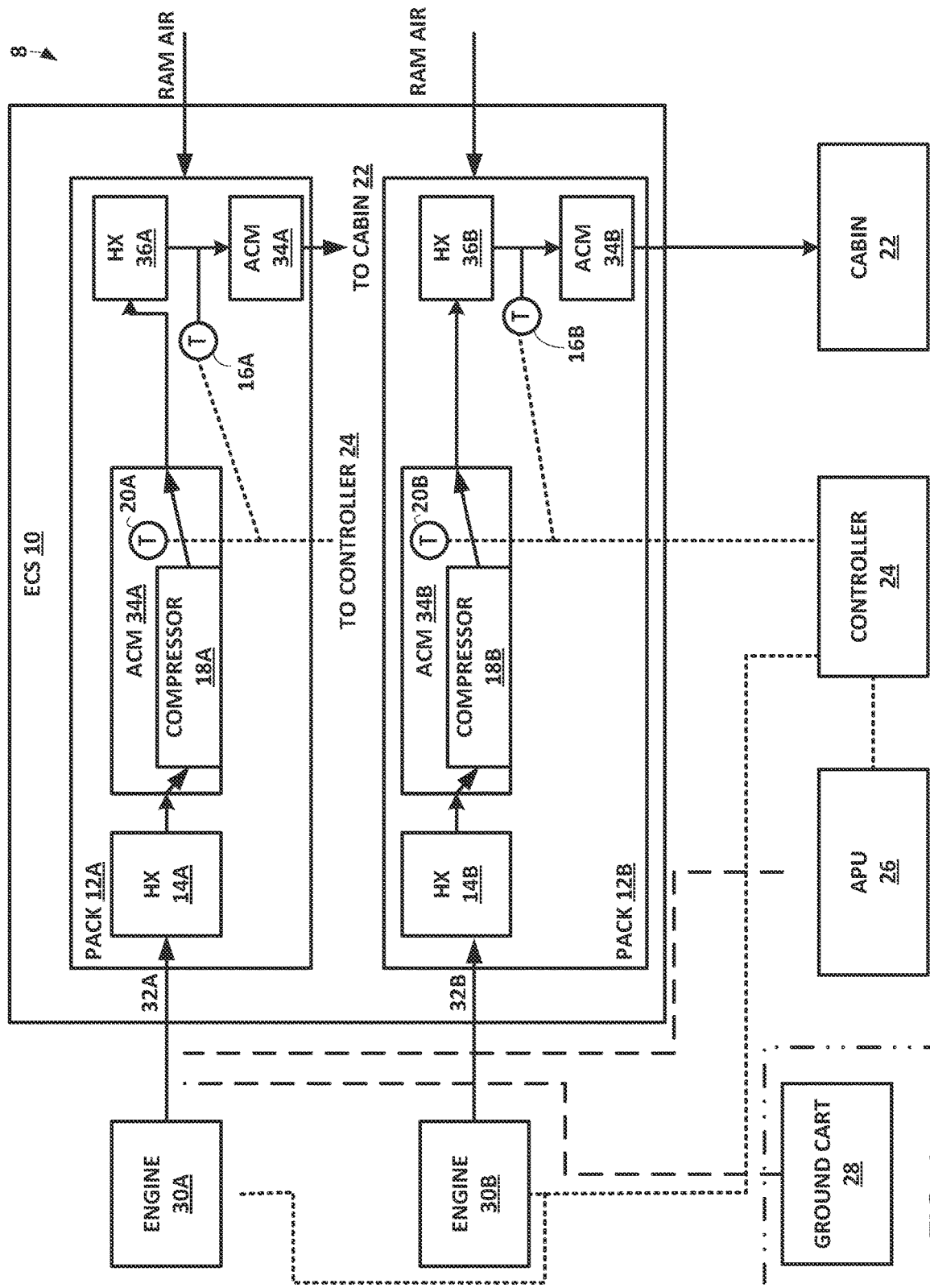
FIG. 1 is a block diagram of an example vehicle having an environmental control system (ECS) system according to the techniques of this disclosure.

An environmental control system (ECS) for a vehicle, such as an aircraft, may be responsible for providing air within the vehicle for the vehicle's occupants, as well as controlling the environment, such as the temperature and pressure within the vehicle. While the discussion herein is primarily directed to an aircraft, the techniques of this disclosure may be applicable to any type of vehicle having one or more elements of an environmental control system, such as an automobile, a truck, a boat, a ship, a submarine, a spacecraft, etc.

In the example of an aircraft ECS, the ECS may include one or more air conditioning packages (also referred to herein as a packs) that supply temperature-controlled air to an onboard cabin, flight, and equipment zones. The pack may include an air cycle machine (ACM), which cools external air that is fed into the ECS through high-pressure bleed air from engines, auxiliary power units (APUs), or a ground cart. Cooler environmental air is sucked into a ram air system through a ram air fan that is driven by the ACM to cool off the bleed air using heat exchangers (HXs). Operational evidence shows that the HXs may become blocked when the environmental air is polluted, which reduces the cooling efficiency to the bleed air and the pack cooling efficiency in general.

A common complaint from the aircraft passengers is that the cabin is too hot. As the blocking of HXs becomes serious, a pack temperature warning may be triggered, which may stop the aircraft from dispatching and cause the aircraft to be pulled out of service. Unexpectedly pulling an aircraft out of service may cause a large financial impact for an airline and inconvenience the airline's passengers. Contaminated HXs may also restrict the flow through the ACM fan, which reduces the ACM fan surge margin, potentially resulting in ACM fan failures.

Some airlines may spend millions of dollars each year addressing pack maintenance issues and delays due to dirty HXs. While HXs may be cleaned often, there is no assurance that the pack may not fail. Maintenance based on the HX blocking condition may be desired by the airlines so the airlines may reduce maintenance costs. Furthermore, a prediction of when elements of an ECS, such as an HX, may fail may be even more desired as such a prediction may improve maintenance planning, reduce dispatchability impact, and increase aircraft safety.

Existing methods being used to detect ECS problems may require installation of additional sensors on the vehicle (e.g., the aircraft), such as sensors to measure pressure drop across HXs, or the temperature changes across HXs, as such sensors are not included in a conventional pack system. Adding new sensors on an aircraft may result in an economical and operational impact on the airline. Also, the existing methods are mainly focused on diagnostics and may have limited ability of early prediction or detection of a functional failure of the ECS, which may prevent the airline from actually reducing the operation and/or maintenance costs. The techniques of this disclosure may provide for the prediction of ECS failures using existing sensors to support operational efficiency and reduce operational costs.

According to the techniques of this disclosure, performance-based monitoring of ECSs and predicting of potential failures of ECS systems or components thereof is provided. According to the techniques of this disclosure, a controller may predict the potential failure of an ECS system. The controller may determine a performance status of an ECS based on a residual determination and/or a hard limit determination. For example, the controller may determine the performance status of the ECS based on a residual compressor exit temperature and/or a pack temperature. Data may be collected including altitude, outside ambient temperature, humidity, pack temperature (e.g., a temperature measurement within an air conditioning unit or package). The controller may determine an estimated compressor exit temperature of air exiting a compressor in the ACM and determine a current residual compressor exit temperature based on the difference between the estimated compressor exit temperature and a current compressor exit temperature. The controller may first compare the current residual compressor exit temperature to trending data, and may determine a first indication of the performance of the ECS based on the first comparison. Additionally, the controller may second compare pack temperature with trending data, and may determine a second indication of the performance of the ECS based on the second comparison. The first indication and/or the second indication may be used to determine a performance status of the ECS, such as prediction of potential failure of the ECS. The controller may provide an indication of the performance status of the ECS.

FIG. 1 is a block diagram of an example vehicle having an ECS system according to the techniques of this disclosure. Vehicle 8 includes ECS 10, cabin 22, controller 24, APU 26, engine 30A, and engine 30B. Ground cart 28 is also depicted, but is not part of vehicle 8 and is shown separated by an alternating dashed and dotted line.

Cabin 22 is a compartment of a vehicle, such as an aircraft, that includes an internal environment. For example, cabin 22 may be configured to house people, cargo, and the like, in the internal environment. Cabin 22 may be fluidically coupled to ECS 10. To maintain adequate conditions within the internal environment of cabin 22, such as for personal comfort or required by law or industry standard, ECS 10 may be configured to control ambient conditions of cabin 22. For example, ECS 10 may be configured to control a pressure, temperature, humidity, air flow rate, or other ambient conditions of cabin 22 at various aircraft conditions, such as ground operation, passenger loading, take-off, cruising, descent, and landing. ECS 10 may be configured to generate ECS discharge air from ECS supply air (e.g., bleed air from engine 30A and/or engine 30B, APU 26, or ground cart 28) according to one or more setpoints for ambient conditions of cabin 22. For example, ECS 10 may generate ECS discharge air to maintain a target range of pressures, temperatures, and/or humidity of cabin 22.

ECS 10 may include pack 12A and pack 12B (collectively, packs 12). While the example of FIG. 1 depicts two packs, any number of packs may be used according to the techniques of this disclosure. Pack 12A includes primary heat exchanger (HX) 14A, ACM 34A, secondary HX 36A, and temperature sensor 16A. Pack 12B includes primary HX 14B, ACM 34B, secondary HX 36B and temperature sensor 16B. Temperature sensor 16A which may sense a pack temperature in pack 12A. Temperature sensor 16B which may sense a pack temperature in pack 12B. Packs 12 may also include components, such as water separators, but these components are not shown for simplicity purposes.

ACM 34A may include compressor 18A and temperature sensor 20A. Similarly, ACM 34B may include compressor 18B and temperature sensor 20B. Compressor 18A and compressor 18B may be configured to compress air from primary HX 14A and primary HX 14B, respectively. Temperature sensor 20A and temperature sensor 20B may be configured to sense a compressor exit temperature of air exiting compressor 18A and compressor 18B, respectively.

Input 32A to pack 12A may be fluidically coupled to engine 30A, APU 26 or ground cart 28. For example, environmental air, such as bleed air from engine 30A, air from APU 26 or air from ground cart 28 may be input to pack 12A at input 32A. Input 32B to pack 12B may be fluidically coupled to engine 30B, APU 26 or ground cart 28. For example, bleed air from engine 30A, air from APU 26 or from ground cart 28 may be input to pack 12B at input 32B. The air input to input 32A and input 32B may be relatively hot (e.g., over 150 degrees Fahrenheit). Air at ambient atmospheric temperature may be collected in a ram air system (not shown for simplicity purposes) that may be fluidically coupled to packs 12 and may be used to cool the relatively hot air through the primary and secondary HXs, as will be further described herein with respect to FIG. 2.

The ram air may be at a lower temperature than the air input to input 32A and input 32B. Primary HX 14A may cool the air input to input 32A using the ram air. Primary HX 14B may cool the air input to input 32B using the ram air. The air exiting compressor 18A and compressor 18B may be warmer than the air entering compressor 18A and compressor 18B. As such, secondary HX 36A and secondary HX 36B may cool the air exiting compressor 18A and compressor 18B, respectively. The air exiting secondary HX 36A may flow back into ACM 34A and the air exiting secondary HX 36B may flow back into ACM 34B, for example, where the air may enter turbines. The air from ACM 34A and ACM 34B may also flow through other devices or components, which are not shown for simplicity purposes, prior to providing cooled air to cabin 22 for passenger air supply and comfort, as well as for electronic equipment cooling, etc.

Controller 24 may monitor ECS 10 and other devices or systems that may be part of the vehicle. For example, controller 24 may be communicatively coupled to instrumentation, such as flow meters, temperature sensors, and pressure sensors, and configured to receive measurement signals from the instrumentation. Controller 24 may include any of a wide range of devices, including processors (e.g., one or more microprocessors, one or more application specific integrated circuits (ASICs), one or more field programmable gate arrays (FPGAs), or the like), servers, desktop computers, notebook (e.g., laptop) computers, tablet computers, and the like. In some examples, controller 24 may be an onboard device within the vehicle. In other examples, controller 24 may be an off-board device external device outside of the vehicle. In some examples, controller 24 may be a portable device which may be used within the vehicle or external to the vehicle. In some examples, controller 24 may be include components within the vehicle and components external to the vehicle.

Connections between controller 24 and these other devices or systems are shown in FIG. 1 with dotted lines. For example, controller 24 may monitor temperature sensor 16A, temperature sensor 16B, temperature sensor 20A, and temperature sensor 20B. Controller 24 may monitor various parameters associated with APU 26. Controller 24 may also monitor parameters associated with engine 30A and engine 30B.

Controller 24 may perform one or more techniques of this disclosure. For example, controller 24 may preprocess data, may determine trigger conditions have occurred, may determine steady state data, may determine pack temperature and a current compressor exit temperature at the steady state, may determine an estimated compressor exit temperature, may determine a performance status of EC S 10, and may provide an indication of the performance status of ECS 10.

For example, controller 24 may preprocess aircraft data and weather data. In some examples, both the aircraft data and the weather data may be received from devices or systems on-board the aircraft. In some examples, the aircraft data may be received from devices or systems on-board the aircraft, while the weather data may be received from devices or systems external to the aircraft. Controller 24 may identify a location and a corresponding time in the aircraft data. This location and time may represent an in-flight location and corresponding time or a ground location and corresponding time when the aircraft was not in flight. Controller 24 may determine corresponding weather data indicative of the weather corresponding with the location and time. Controller 24 may extract the humidity and total air temperature (TAT) from the corresponding weather data and the altitude from the aircraft data. In this manner, controller 24 may preprocess the aircraft data and the weather data.

Controller 24 may also determine whether trigger conditions have occurred. For example, controller 24 may only determine steady state data after trigger conditions have occurred. In some examples, the trigger conditions may include one or more of the following: APU 26 is in operation; pack 12A and pack 12B are on; or the vehicle is in ground operation (e.g., on the ground or not in-flight). In some examples, all three trigger conditions must be true before controller 24 determines steady state data.

When the trigger conditions have been met, controller 24 may attempt to determine a steady state of one or more parameters. For example, as in other mechanical systems, the performance of ECS 10 may be best assessed in a steady state as system transients may lead to an incorrect assessment of the performance of ECS 10. Thus, according to the techniques of this disclosure, controller 24 may attempt to determine the steady state of the ECS 10 operation.

For example, controller 24 may attempt to determine a steady state for one or more of APU inlet guide vane (IGV) position, APU supply pressure, compressor exit temperature, or pack temperature, etc. In some examples, controller 24 may attempt to determine a steady state for other parameters. Other parameters may include computed airspeed, ram voltage, pack voltage, precooler outlet temperature, duct pressure, APU total pressure, pressure altitude, TAT, APU rotor speed, APU corrected flow, ECS pack on/off, cabin differential pressure, engine tach, engine bleed, wing anti ice, cabin pressure, ECS isolation valve, ESC pack, APU bleed valve, air or ground, flight mode, engine speed fan, auto channel fail controller-pilot communications (CPC), engine cowl anti-ice, ECS pack flow, ECS Pack high or low, outflow valve position CPC, selected landing field elevation, APU temperature, APU surge control valve (SCV) position, cabin rate, exhaust gas temperature, auto in control CPC, APU temperature, APU oil temperature, select cruise flight level CPC; etc. In some examples, controller 24 may correlate the weather data with the steady state of the one or more of the parameters.

Controller 24 may attempt to determine the steady state for the one or more parameters by computing a variation for the parameter in a moving window and selecting the instance of the moving window having the least variation. In some examples, controller 24 may select the instance of the moving window having the least variation across all the parameters. In other examples, controller 24 may select an instance of the moving window for each parameter separately. In some examples the variation may be a standard deviation normalized with respect to a mean. Controller 24 may determine a value for each parameter based on the instance(s) of the moving window having the least variations. For example, controller 24 may determine the value for each parameter by calculating a mean, median or mode value for the parameter over the instance of the moving window having the smallest variation. In another example, controller 24 may determine the value for each parameter to equal a value at a midpoint of the instance of the moving window having the smallest variation. In this manner, controller 24 may determine steady state values of the one or more parameters.

Controller 24 may determine a pack temperature steady state and a current compressor exit temperature. For example, controller 24 may determine a steady state as discussed above for a pack temperature (e.g., a temperature sensed at temperature sensor 16A and/or temperature sensor 16B) and may determine a current compressor exit temperature (e.g., a temperature sensed at temperature sensor 20A and/or temperature sensor 20B). In some examples, the current compressor exit temperature may be a current compressor exit temperature at steady state.

Controller 24 may then determine an estimated compressor exit temperature. For example, controller 24 may run a model to determine the estimated compressor exit temperature. Controller 24 may determine a current residual compressor exit temperature by subtracting one of the estimated compressor exit temperature or the sensed current compressor exit temperature from the other. Controller 24 may compare the current residual compressor exit temperature to trending data including past residual compressor exit temperatures. Controller 24 may also compare a sensed pack temperature to trending data including past pack temperatures. Based on one or both of these comparisons, controller 24 may determine a performance status of ECS 10 and may provide an indication of the performance status of ECS 10.

Figure 2:
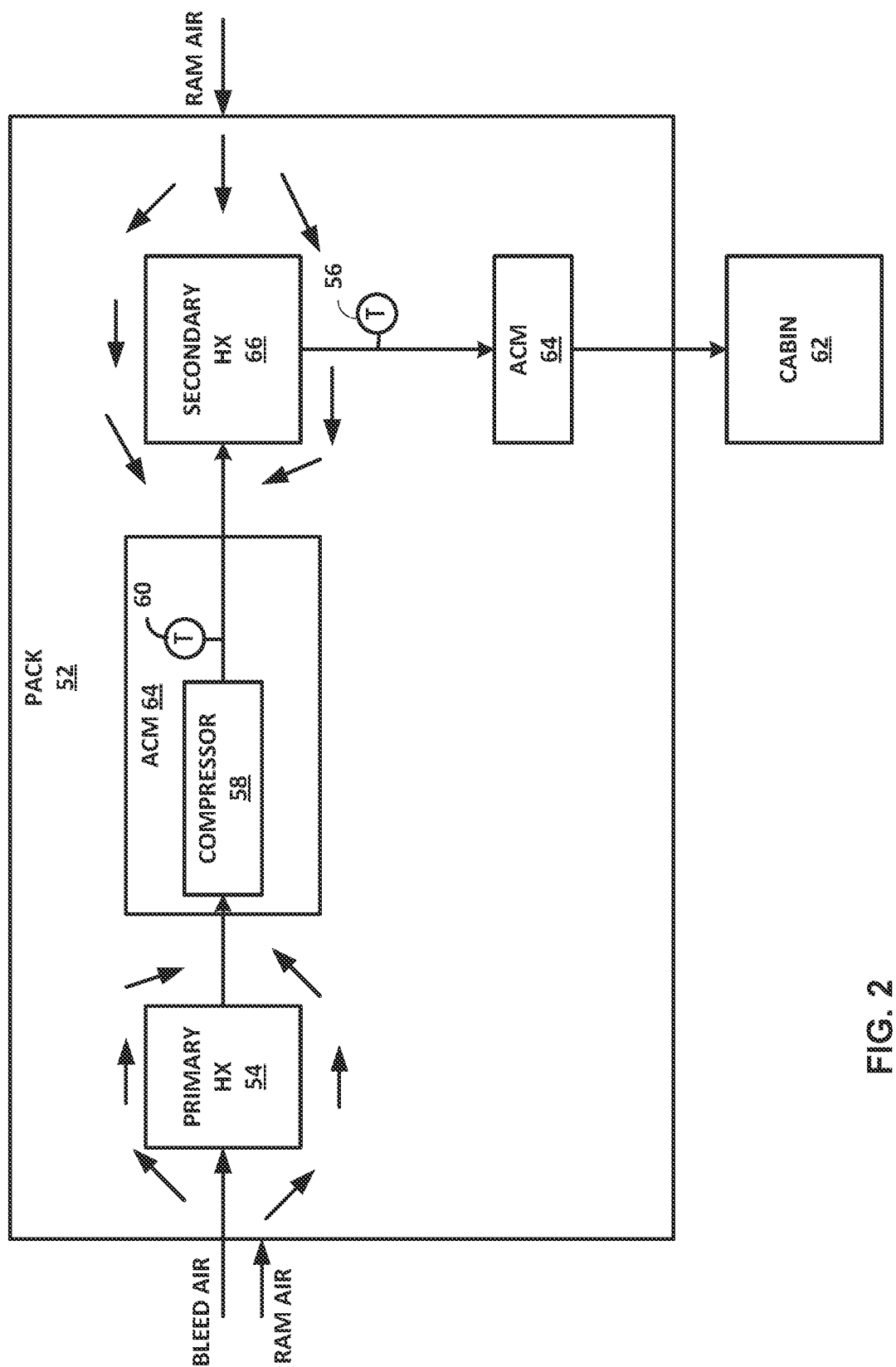
FIG. 2 is a block diagram of an example pack according to the techniques of this disclosure.

FIG. 2 is a block diagram of an example pack according to the techniques of this disclosure. Pack 52 of FIG. 2 may be an example of pack 12A or pack 12B of FIG. 1. Bleed air from an engine, such as engine 30A or engine 30B of FIG. 1 may be input into pack 52. The bleed air may enter primary HX 54. Ram air from a ram air intake (not shown for simplicity purposes) may also be input to pack 52. The ram air may circulate around primary HX 54. The ram air may be at a lower temperature than the bleed air. Primary HX 54 may cool the bleed air in primary HX 54 through thermal exchange with the ram air circulating around primary HX 54. The cooled bleed air may enter compressor 58 in ACM 64. Compressor 58 may compress the cooled bleed air, which may also raise the temperature of the cooled bleed air. Temperature sensor 60 may sense the temperature of the compressed air. The compressed air may enter secondary HX 66. Ram air may also circulate around secondary HX 66. The compressed air may be hotter than the ram air and may be cooled through thermal exchange with the ram air. Temperature sensor 56 may sense a pack temperature at some point after the secondary HX 66. In this manner, pack 52 may cool bleed air (or air from APU 26 or ground cart 28 of FIG. 1). The compressed air sensed by temperature sensor 56 may enter ACM 64, and for example, be input into a turbine (not shown for simplicity purposes). The air exiting the turbine may be input to other devices or components before being used to provide cooled air to cabin 62 for passenger air supply and comfort, as well as for electronic equipment cooling, etc.

Figure 3:
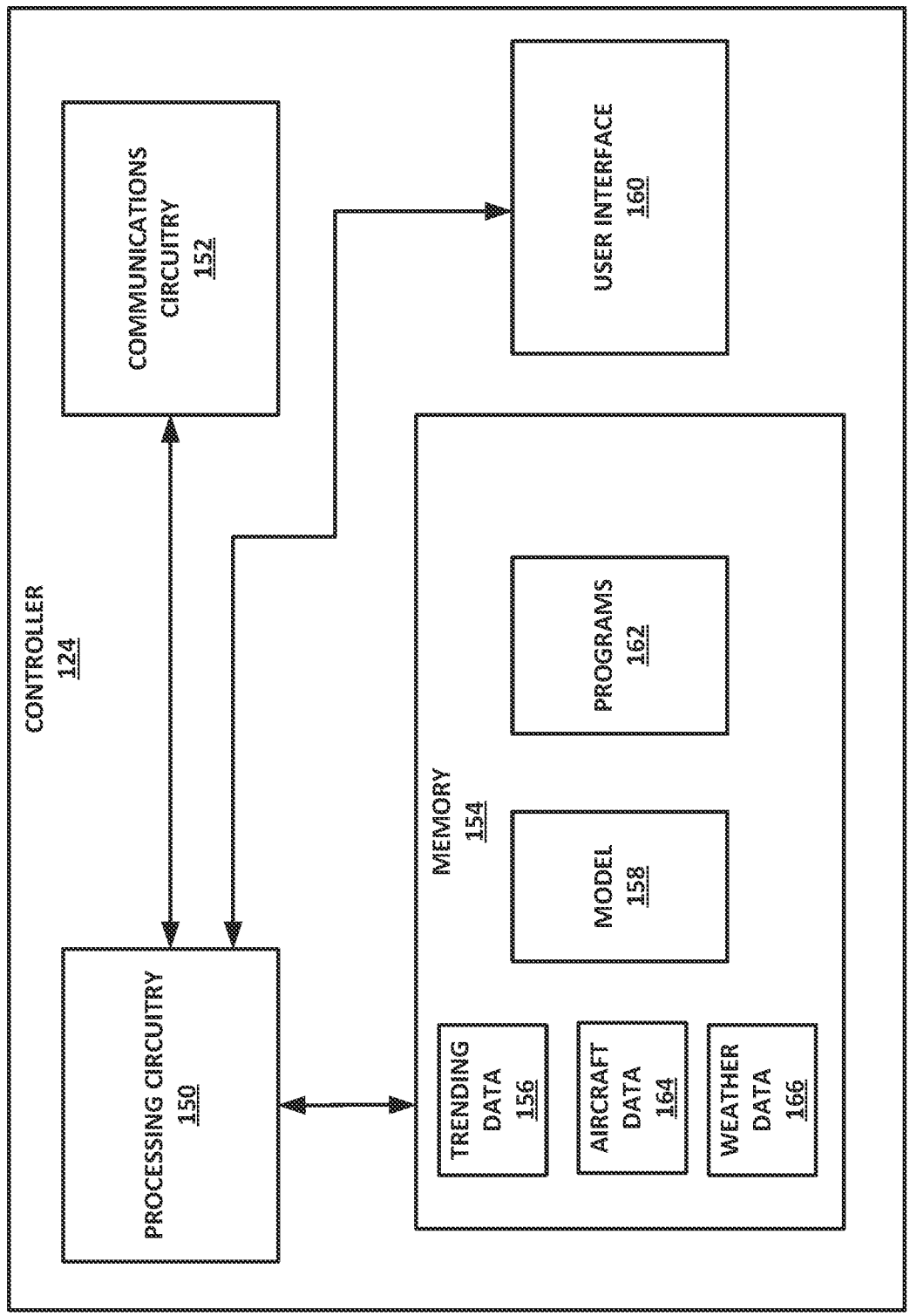
FIG. 3 is a block diagram of an example controller according to the techniques of this disclosure.

FIG. 3 is a block diagram of an example controller according to the techniques of this disclosure. Controller 124 of FIG. 3 may be an example of controller 24 of FIG. 1. Controller 124 may include processing circuitry 150, communications circuitry 152, user interface 160, and memory 154. Controller 124 may also include other components which are not shown for simplicity purposes.

Processing circuitry 150 may include one or more microprocessors, one or more ASICs, one or more FPGAs, or the like. Communications circuitry 152 may be configured to monitor sensors associated with various devices or systems of the vehicle, such as APU 26, engine 30A, engine 30B, pack 12A, pack 12B, compressor 18A, and compressor 18B, for example. Communications circuitry 152 may include wired and/or wireless circuitry. Communications circuitry 152 may also be configured to communicate with various devices or systems, such as cockpit gauges, on-board computers, external computers, servers or the like.

User interface 160 may include a display, a touch screen, a keyboard, a mouse or other devices to provide information to a user or receive input from a user. In some examples, controller 124 may provide an indication of the performance status of ECS 10 via user interface 160.

Memory 154 of controller 124 may be coupled to processing circuitry 150 and may store trending data 156. Trending data 156 may include past pack temperature values, past residual compressor exit temperature values, and/or other past parameter values. Memory 154 may also store aircraft data 164. Aircraft data 164 may include information regarding the aircraft and/or devices or systems of the aircraft. For example, aircraft data 164 may include location data, times, altitude data, etc. Memory 154 may also store weather data 166. Weather data 166 may be indicative of the weather at a particular location and time. Weather data 166 may include ambient temperature, humidity, etc. Trending data 156, aircraft data 164, and weather data 166 may all include time and/or location information, such that the trending data can be associated with or correlated with the aircraft data and weather data. In some examples, processing circuitry 150 may update trending data 156 based on aircraft data 164 or weather data 166. As one example, for a particular past pack temperature value, controller 124 may be able to determine the weather or an aircraft status for the time at which the particular past pack temperature was obtained.

Memory 154 may also include model 158 which may be utilized by processing circuitry 150 to determine the estimated compressor exit temperature. In some examples, model 158 may be an artificial intelligence model, such as random forest model, a fast and frugal tree model, a CART: Classification and Regression Decision Tree model, a logistic regression model, a support vector machine model or other machine learning model. For example, model 158 may be a trained model that is configured, when executed by processing circuitry 150, to cause processing circuitry 150 to estimate a compressor exit temperature based on one or more parameters, such as altitude, outside ambient temperature, humidity and pack temperature at steady state, etc. For example, model 158 may be trained using actual compressor exit temperatures of ECSs (from one or more vehicles) and the one or more parameters measured at various times. As with most models, generally, the more data that is used to train the model, the more likely the model is to be accurate.

Memory 154 may include programs 162, e.g., which may include instructions, which when executed by processing circuitry 150 cause processing circuitry 150 to perform certain techniques, such as comparing trending data 156 to other sensed or determined values, such as a residual compressor exit temperature or a pack temperature.

Figure 4:
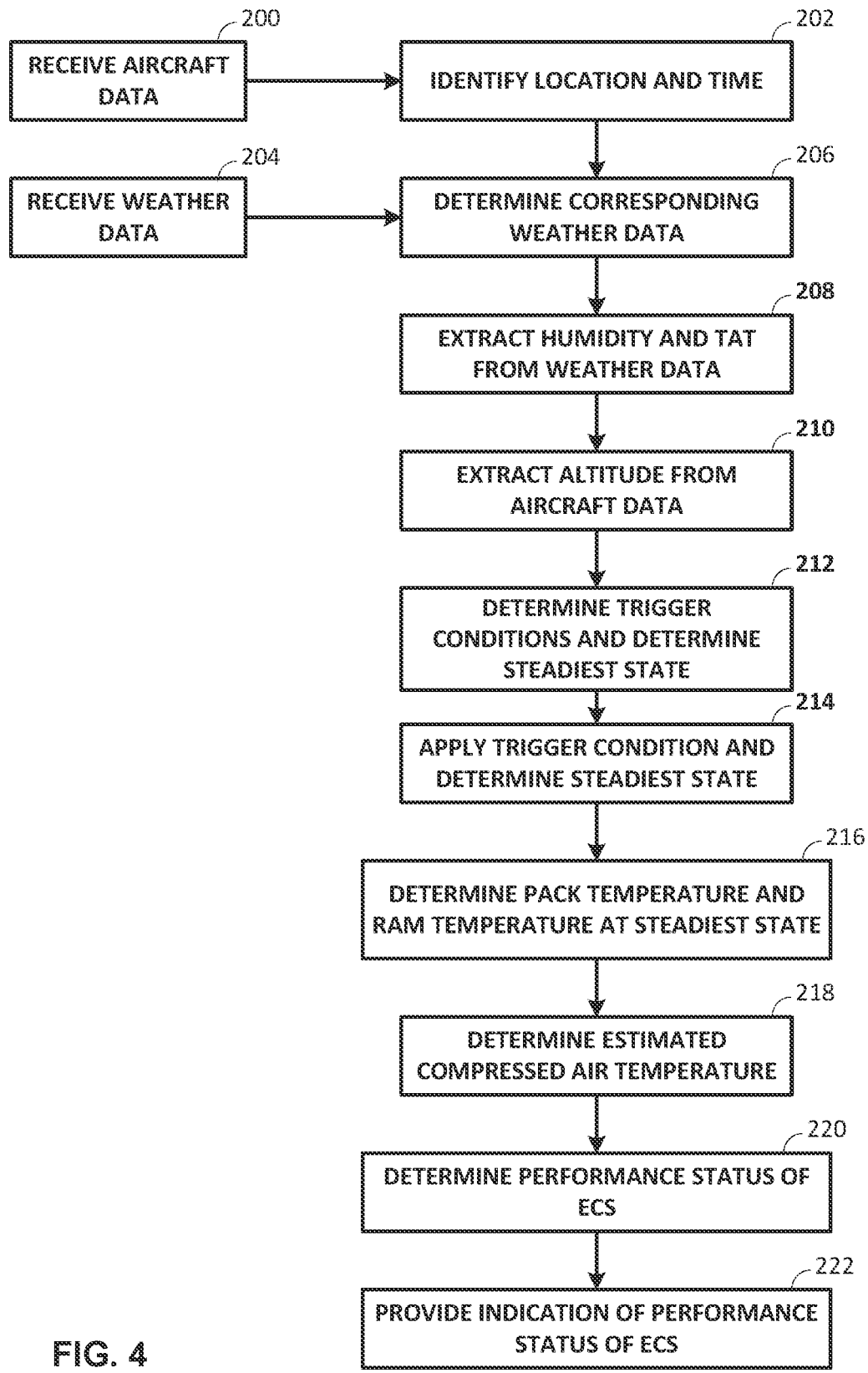
FIG. 4 is a flow chart illustrating example techniques of determining a performance status of an ECS according to this disclosure.

FIG. 4 is a flow chart illustrating example techniques of determining a performance status of an ECS according to the techniques of this disclosure. Processing circuitry 150 of controller 124 may receive aircraft data (200). For example, processing circuitry 150 may receive through communications circuitry 152 aircraft data from vehicle 8. The aircraft data may include information regarding the aircraft and/or devices or systems of the aircraft. For example, the aircraft data may include location data, times, altitude data, etc. Processing circuitry 150 may identify a location and associated time in the aircraft data (202). For example, the location and time may represent an in-flight location and corresponding time or a ground location and corresponding time when the aircraft was not in flight. Processing circuitry 150 may determine corresponding weather data (206) which may be indicative of the weather corresponding with the location and time.

Processing circuitry 150 may extract humidity and TAT from the corresponding weather data (208). For example, processing circuitry 150 may find the humidity and TAT from weather data corresponding to the location and time in the aircraft data, extract them from the weather data and associate them with the corresponding location and time data.

Processing circuitry 150 may determine whether trigger conditions have occurred and determine a steady state of one or more parameters (212). For example, the trigger conditions may include one or more of the following: APU 26 is in operation; pack 12A and pack 12B are on; or the vehicle is in ground operation (e.g., not in-flight). In some examples, all three trigger conditions must be true before processing circuitry 150 determines a steady state. For example, processing circuitry 150 may monitor APU 26, pack 12A, pack 12B and any of a number of devices or systems to determine whether the aircraft is in ground operation through communications circuitry 152. When the trigger conditions have been met, processing circuitry 150 may determine the steady state for one or more parameters. The one or more parameter may include one or more of APU IGV position, APU supply pressure, compressor exit temperature, or pack temperature, etc.

Processing circuitry 150 may attempt to determine the steady state for the one or more parameters by computing a variation for the parameter in a moving window and selecting the instance of the moving window having the least variation. For example, processing circuitry 150 may determine a steady state of altitude, outside ambient temperature, humidity, pack temperature, etc. In some examples, processing circuitry 150 may select the instance of the moving window having the least variation across all the parameters. In other examples, processing circuitry 150 may select an instance of the moving window for each parameter separately. In some examples, the variation may be a standard deviation normalized with respect to a mean. Processing circuitry 150 may determine a value for each parameter based on the instance(s) of the moving window having the least variations. For example, processing circuitry 150 may determine the value for each parameter by calculating a mean, median or mode value for the parameter over the instance of the moving window having the smallest variation. In another example, processing circuitry 150 may determine the value for each parameter to equal a value at a midpoint of the instance of the moving window having the smallest variation.

Processing circuitry 150 may determine a pack temperature at a steady state and a current compressor exit temperature (e.g., from temperature sensor 20A or temperature sensor 20B). For example, processing circuitry 150 may determine a steady state, as discussed above, for a pack temperature (e.g., a temperature sensed at temperature sensor 16A and/or temperature sensor 16B). The value(s) of the steady state parameters may be used as input into model 158 to determine the estimated compressor exit temperature.

Processing circuitry 150 may determine an estimated compressor exit temperature (218). For example, processing circuitry 150 may load model 158 and may run model 158 to determine the estimated compressor exit temperature based on the one or more parameters, such as altitude, outside ambient temperature, humidity or pack temperature, etc. Processing circuitry 150 may determine a performance status of ECS 10 (220). For example, processing circuitry 150 may determine a current residual compressor exit temperature by subtracting one of the estimated compressor exit temperature or the sensed current compressor exit temperature from the other. Processing circuitry 150 may compare the current residual compressor exit temperature to trending data including past residual compressor exit temperatures. Processing circuitry 150 may also compare a sensed pack temperature to trending data including past pack temperatures. Based on one or both of these comparisons, controller 24 may determine a performance status of ECS 10. Processing circuitry 150 may provide an indication of the performance status of ECS 10 (222). For example, processing circuitry 150 may display an indication of performance status of ECS 10 on user interface 160 or may communicate the indication of performance status of ECS 10 through communications circuitry to one or more devices or systems external to controller 124, such as a cockpit display, a maintenance scheduling system, or the like.

Figure 5:
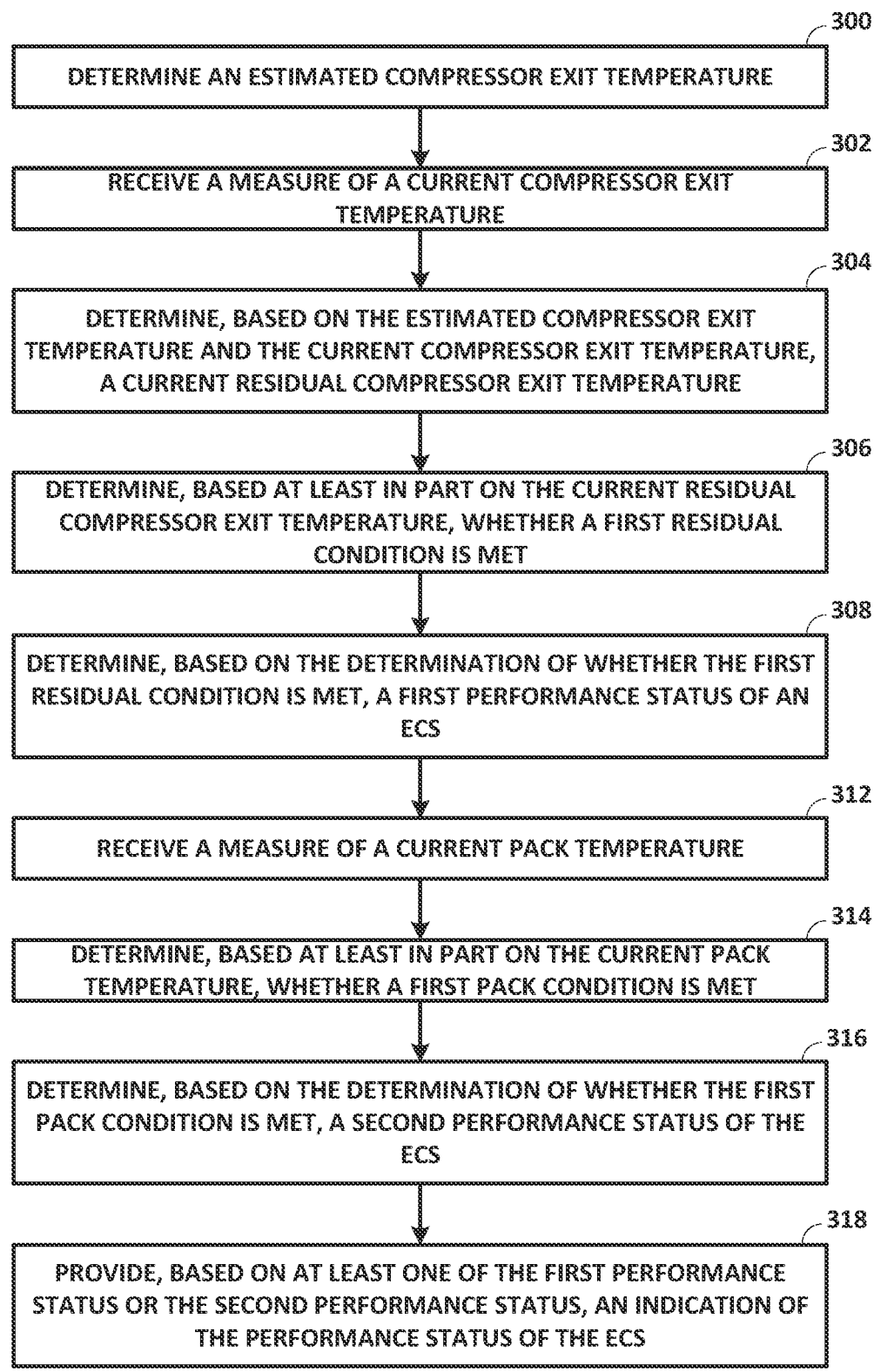
FIG. 5 is another flow chart illustrating example techniques of determining a performance status of an ECS according to this disclosure.

FIG. 5 is another flow chart illustrating example techniques of determining a performance status of an ECS according to this disclosure. Processing circuitry 150 may determine an estimated compressor exit temperature (300). For example, processing circuitry 150 may determine an altitude, an outside ambient temperature, a humidity and a pack temperature at a steady state. Processing circuitry 150 may load and run model 158 to determine an estimated compressor exit temperature based on one or more of the altitude, the outside ambient temperature, the humidity and the pack temperature at a steady state.

Processing circuitry 150 may determine a current compressor exit temperature (302). For example, processing circuitry 150 may read a value of temperature sensor 20A or temperature sensor 20B. In some examples, the current compressor exit temperature may be a temperature at a point in time. In other examples, the current compressor exit temperature may be a steady state compressor exit temperature which is determined as discussed above with respect to FIG. 4. Processing circuitry 150 may determine a current residual compressor exit temperature based on the estimated compressor exit temperature and the current compressor exit temperature (304). For example, processing circuitry 150 may subtract the estimated compressor exit temperature from the current compressor exit temperature to determine the current residual compressor exit temperature. Alternatively, processing circuitry 150 may subtract the current compressor exit temperature from the estimated compressor exit temperature to determine the current residual compressor exit temperature. In some examples, processing circuitry 150 may smooth the current residual compressor exit temperature through, e.g., a smoothing algorithm, which may be stored in memory 154.

In some examples, processing circuitry 150 may determine whether the estimated compressor exit temperature and/or the current residual compressor exit temperature is appropriate or acceptable for inclusion in trending data 156. For example, processing circuitry 150 may compare predetermined parameters to results of a sensitivity analysis to determine whether the estimated compressor exit temperature and/or the current residual compressor exit temperature is appropriate or acceptable for inclusion in trending data 156. In some examples, processing circuitry 150 may determine, based on the results of the sensitivity analysis, whether the current residual compressor exit temperature is to be added to trending data and may add, based on the determination that the current residual compressor exit temperature is to be added to trending data, the current residual compressor exit temperature to the trending data.

The sensitivity analysis may be performed by using a machine learning model such as random forest model, a fast and frugal tree model, a CART: Classification and Regression decision Trees model, a logistic regression model, a support vector machine model, or another machine learning model. For example, the sensitivity analysis may determine that if the auxiliary power unit total pressure (PTA) is greater than 45.75, model 158 will not be negatively affected by including the estimated compressor exit temperature and/or the current residual compressor exit temperature in trending data 156. For example, the sensitivity analysis may determine that if the inlet guide vane angle (IGVA) is greater than 57, model 158 will not be negatively affected by including the estimated compressor exit temperature and/or the current residual compressor exit temperature in trending data 156. For example, the sensitivity analysis may determine that if a left temperature control valve flow is less than or equal to 10.73, model 158 will be negatively affected by including the estimated compressor exit temperature and/or the current residual compressor exit temperature in trending data 156.

These are just a few examples of predetermined parameters that may be used by processing circuitry 150 to determine whether to include the estimated compressor exit temperature and/or the current residual compressor exit temperature in trending data 165. Other parameters may be used in place of, or in addition to, the above-mentioned predetermined parameters.

In some examples, if the comparison of the predetermined parameters to the results of the sensitivity analysis indicate that the inclusion of the estimated compressor exit temperature and/or the current residual compressor exit temperature should not negatively affect the ECS model, processing circuitry 150 may update trending data 156 based on the estimated compressor exit temperature and/or the current residual compressor exit temperature. For example, processing circuitry 150 may add the estimated compressor exit temperature, the current residual compressor exit temperature, or a value based thereon, to trending data 156. In some examples, if the comparison of the predetermined parameters to the results of the sensitivity analysis indicate that the inclusion of the estimated compressor exit temperature and/or the current residual compressor exit temperature would negatively affect the ECS model, processing circuitry 150 may not update trending data 156 based on the estimated compressor exit temperature and/or the current residual compressor exit temperature. For example, processing circuitry 150 may not add the estimated compressor exit temperature, the current residual compressor exit temperature, or a value based thereon, to trending data 156

Processing circuitry 150 may determine if a first residual condition is met (306). For example, processing circuitry 150 may use an M of N analysis against a first residual threshold and/or compare a moving average to the first residual threshold to determine whether the first residual condition is met.

For example, processing circuitry 150 may compare N number of residual compressor exit temperatures (e.g., the current residual compressor exit temperature and the N−1 most recent residual compressor exit temperatures in trending data 156) to the first residual threshold. In some examples, if there are M number of residual compressor exit temperatures of the N number of residual compressor exit temperatures that exceed first residual threshold, then processing circuitry 150 may determine the first residual condition is met. In some examples, the current residual compressor exit temperature must also exceed the first residual threshold for processing circuitry 150 to determine that the first residual condition is met. In some examples, M may equal 2, N may equal 3 and the first residual threshold may be a first number of degrees, such as 20 degrees F.

In some examples, in addition to, or alternatively, processing circuitry 150 may determine whether the first residual condition is met based on a comparison of a moving average of a predetermined number (e.g., 5) of most recent residual compressor exit temperatures to the first residual threshold. For example, if the moving average of the predetermined number of most recent residual compressor exit temperatures exceeds the first residual threshold, processing circuitry 150 may determine that the first residual condition is met.

Processing circuitry 150 may determine, based the determination of whether the first residual condition is met, a first performance status of ECS 10 of vehicle 8 (308). For example, processing circuitry 150 may determine ECS 10 is operationally sound, ECS 10 may soon fail, or ECS 10 is failing or has failed based on the determination of whether the first residual condition is met. For example, if the first residual condition is not met, processing circuitry 150 may determine the first performance status of ECS 10 to be operationally sound. If the first residual condition is met, processing circuitry 150 may determine the first performance status of ECS 10 to be operationally unsound (e.g., ECS 10 may soon fail, is failing or has failed).

In some examples, processing circuitry 150 may determine if a second residual condition is met. For example, processing circuitry 150 may use an M of N analysis against a second residual threshold and/or compare a moving average to the second residual threshold to determine whether the second residual condition is met as described above with respect to the first residual condition. In some examples, the second residual threshold is higher than the first residual threshold. In some examples, the second residual threshold is a second number of degrees that is higher than the first residual threshold, such as 30 degrees F. In some examples, processing circuitry 150 may use the same M, the same N, or the same moving average as in the determination of whether the first residual condition is met. In some examples, processing circuitry 150 may use a different M, the different N, or the different moving average as in the determination of whether the first residual condition is met. For example, M may be 2, N may be 4 and the moving average may be the same. In some examples, processing circuitry 150 may determine ECS 10 is operationally sound if the first residual condition is not met. In some examples, processing circuitry 150 may determine ECS 10 may soon fail if the first residual condition is met, but the second residual condition is not met. In some examples, processing circuitry 150 may determine ECS 10 is failing or has failed if the first residual condition is met and the second residual condition is met. In some examples, additional residual condition(s) may be utilized to provide further granularity to the performance status of ECS 10.

Processing circuitry 150 may also determine a pack temperature (312). For example, processing circuitry 150 may read a value from temperature sensor 16A or temperature sensor 16B. In some examples, processing circuitry 150 may determine the pack temperature by determining the pack temperature at the steady state, as discussed above with respect to FIG. 3.

Processing circuitry 150 may determine whether a first pack condition is met (314). For example, processing circuitry 150 may use an M of N analysis against a first pack threshold and/or compare a moving average to the first pack threshold to determine whether the first pack condition is met.

For example, processing circuitry 150 may compare N number of pack temperatures (e.g., the current pack temperature and the N−1 most recent pack temperatures in trending data 156) to the first pack threshold. In some examples, if there are M number of pack temperatures of the N number of pack temperatures that exceed first pack threshold PT1, then processing circuitry 150 may determine the first pack condition is met. In some examples, the pack temperature must also exceed the first pack threshold for processing circuitry 150 to determine that the first pack condition is met.

In some examples, in addition to, or alternatively, processing circuitry 150 may determine whether the first pack condition is met based on a comparison of a moving average of a predetermined number of most recent pack temperatures to the first pack threshold. For example, if the moving average of the predetermined number of most recent pack temperatures exceeds the first pack threshold, processing circuitry 150 may determine that the first pack condition is met.

Processing circuitry 150 may determine, based the determination of whether the first pack condition is met, a second performance status of ECS 10 of vehicle 8 (316). For example, processing circuitry 150 may determine ECS 10 is operationally sound, ECS 10 may soon fail, or ECS 10 is failing or has failed based on the determination of whether the first pack condition is met. For example, if the first pack condition is not met, processing circuitry 150 may determine the second performance status of ECS 10 to be operationally sound. If the first pack condition is met, processing circuitry 150 may determine the second performance status of ECS 10 to be operationally unsound (e.g., ECS 10 may soon fail, is failing or has failed).

In some examples, processing circuitry 150 may determine if a second pack condition is met. For example, processing circuitry 150 may use an M of N analysis against a second pack threshold and/or compare a moving average to the second pack threshold to determine whether the second pack condition is met as described above with respect to the first pack condition. In some examples, the second pack threshold is higher than the first pack threshold. In some examples, processing circuitry 150 may use the same M, the same N, or the same moving average as in the determination of whether the first pack condition is met. In some examples, processing circuitry 150 may use a different M, the different N, or the different moving average as in the determination of whether the first pack condition is met. For example, M may be 2, N may be 4 and the moving average may be the same. In some examples, processing circuitry 150 may determine ECS 10 is operationally sound if the first pack condition is not met. In some examples, processing circuitry 150 may determine ECS 10 may soon fail if the first pack condition is met, but the second pack condition is not met. In some examples, processing circuitry 150 may determine ECS 10 is failing or has failed if the first pack condition is met and the second pack condition is met. In some examples, additional pack condition(s) may be utilized to provide further granularity to the performance status of ECS 10.

Processing circuitry 150 may provide an indication of the performance status of the ECS based on at least one of the first performance status or the second performance status (318). For example, processing circuitry 150 may display an alert in a display of user interface 160 or provide the alert through communications circuitry 152 to a crew member (e.g., on a cockpit instrument or display), a ground crew member, maintenance personnel, or the like, indicative of the performance status of ECS 10. In some examples, processing circuitry 150 may use both the first performance status and the second performance status when providing the indication of the performance status of the ECS.

In some examples, the indication of the performance status may include a color-coded visual representation of the performance status. For example, processing circuitry may provide a green visual indication if the processing circuitry determines the ECS is operationally sound, a yellow visual indication if the processing circuitry determines the ECS may soon fail, and a red visual indication if the processing circuitry determines the ECS is failing or has failed.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system for determining a performance status of an environmental control system (ECS) in a vehicle, the system comprising:
   a memory, the memory being configured to store aircraft data, weather data, and trending data, the trending data comprising past compressor exit temperatures and past pack temperatures; and
   processing circuitry communicatively coupled to the memory, the processing circuitry being configured to:
      determine, based on one or more of the aircraft data, the weather data, or the trending data, an estimated compressor exit temperature;
      receive, from a first temperature sensor, a measure of a current compressor exit temperature;

determine, based on the estimated compressor exit temperature and the current compressor exit temperature, a current residual compressor exit temperature;

determine, based at least in part on the current residual compressor exit temperature, whether a first residual condition is met;

determine, based on the determination of whether the first residual condition is met, a first performance status of the ECS;

determine, based on results of a sensitivity analysis, whether the current residual compressor exit temperature is to be added to the trending data;

add, based on the determination that the current residual compressor exit temperature is to be added to the trending data, the current residual compressor exit temperature to the trending data;

receive, from a second temperature sensor, a measure of a current pack temperature;

determine, based at least in part on the current pack temperature, whether a first pack condition is met;

determine, based on the determination of whether the first pack condition is met, a second performance status of the ECS; and provide, based on at least one of the first performance status or the second performance status, an indication of the performance status of the ECS.

2. The system of claim 1, wherein the at least one of the first performance status or the second performance status comprises both the first performance status and the second performance status.

3. The system of claim 1, wherein the processing circuitry is further configured to update the trending data based on at least one of the aircraft data or the weather data.

4. The system of claim 1, wherein the processing circuitry is further configured to determine at least one of an altitude, an outside ambient temperature or a humidity, and wherein the estimated compressor exit temperature is based on the at least one of the altitude, the outside ambient temperature, the humidity, or the pack temperature.

5. The system of claim 1, wherein the processing circuitry is further configured to:
determine whether an auxiliary power unit (APU) is in operation;
determine whether packs are on;
determine whether the vehicle is on ground; and
based on the APU being in operation, packs being on, and the vehicle being on the ground, determine a steady state of one or more parameters.

6. The system of claim 5, wherein the one or more parameters comprises at least one of an altitude, an APU inlet guide vane (IGV) position, an APU supply pressure, a compressor exit temperature, or the pack temperature.

7. The system of claim 5, wherein the processing circuitry is configured to determine the steady state of the one or more parameters by:
determining a variation of the one or more parameters over a moving window;
determining a window of the moving window having the smallest variation; and
determining a value of the one or more parameters based on values within the window of the moving window having the smallest variation,
wherein the estimated compressor exit temperature is further based on the value of the one or more parameters.

8. The system of claim 5, wherein the processing circuitry is further configured to correlate the weather data with the one or more parameters.

9. The system of claim 1, wherein the processing circuitry is further configured to:
determine, based at least in part on the current residual compressor exit temperature, whether a second residual condition is met; and
determine, based at least in part on the current pack temperature, whether a second pack condition is met,
wherein the first performance status of the ECS is further based on whether the second residual condition is met and the second performance status of the ECS is further based on whether the second pack condition is met.

* * * * *